US007527556B2

(12) United States Patent
Amada et al.

(10) Patent No.: US 7,527,556 B2

(45) Date of Patent: May 5, 2009

(54) METHOD AND SYSTEMS FOR SHARED-OWNERSHIP LOTTERY PLAYS

(75) Inventors: Andrew R. Amada, Phoenix, AZ (US); Michael D. Lancy, Glendale, AZ (US)

(73) Assignee: PowerPick America, LLC, Phoenix, AZ (US)

( * ) Notice: Subject to any disclaimer, the term of this patent is extended or adjusted under 35 U.S.C. 154(b) by 64 days.

(21) Appl. No.: 11/543,385

(22) Filed: Oct. 4, 2006

(65) Prior Publication Data

US 2007/0077983 A1 Apr. 5, 2007

Related U.S. Application Data

(60) Provisional application No. 60/723,759, filed on Oct. 4, 2005, provisional application No. 60/757,301, filed on Jan. 9, 2006, provisional application No. 60/791, 675, filed on Apr. 12, 2006.

(51) Int. Cl.
*G06F 17/00* (2006.01)
*G06F 19/00* (2006.01)

(52) U.S. Cl. ............................ 463/17; 463/16; 463/18; 463/19; 463/25; 463/42; 273/138.1; 273/139

(58) Field of Classification Search .................... 463/1, 463/16–19, 25; 273/138.1, 139
See application file for complete search history.

(56) References Cited

U.S. PATENT DOCUMENTS 5,083,784 A * 1/1992 Nilssen ........................ 705/14
5,794,219 A 8/1998 Brown
6,024,641 A * 2/2000 Sarno ......................... 463/17
6,210,276 B1 4/2001 Mullins (Continued)

FOREIGN PATENT DOCUMENTS

JP 02001265900 A 9/2001

OTHER PUBLICATIONS

Virtual World Direct—e-Lottery Syndicate: Euro Millions. <URL: http://web.archive.org/web/20050908223556/http://www.virtualworlddirect/vwdguest/eu_lotto.asp>. [dated Sep. 8, 2005] [online] [retrieved Mar. 22, 2008] [6 pages].*

(Continued)

*Primary Examiner*—Scott E Jones
*Assistant Examiner*—Milap Shah
(74) *Attorney, Agent, or Firm*—Tiffany & Bosco, P.A.; Richard E. Oney

(57) ABSTRACT

A method for providing one or more shared-ownership lottery plays using a computer system is provided. Information regarding lottery plays or pools of plays available for shared ownership for a selected game and drawing date is stored A request is received for a shared-ownership lottery play or pool for the selected game and drawing date. The stored information is used to issue an interest in a shared-ownership lottery play or pool in response to the request. Each of the issued shared-ownership lottery plays or pools is selected from the one or more lottery plays or pools available for shared ownership. The ownership of each issued shared-lottery play or pool is assigned an ownership percentage increment of less than 100 percent. A ticket or other receipt represents an ownership percentage in the shared-ownership lottery play or pool equal to the assigned ownership percentage increment.

45 Claims, 6 Drawing Sheets

U.S. PATENT DOCUMENTS

| | | | | |
|---|---|---|---|---|
| 6,220,961 | B1 | 4/2001 | Keane et al. | |
| 6,267,670 | B1 * | 7/2001 | Walker et al. | 463/17 |
| 6,296,569 | B1 * | 10/2001 | Congello, Jr. | 463/17 |
| 6,322,446 | B1 * | 11/2001 | Yacenda | 463/16 |
| 6,450,887 | B1 | 9/2002 | Mir et al. | |
| 6,733,387 | B2 | 5/2004 | Walker et al. | |
| 6,869,358 | B2 * | 3/2005 | Yacenda | 463/17 |
| 6,887,152 | B2 | 5/2005 | Stanek | |
| 6,908,382 | B2 | 6/2005 | Walker et al. | |
| 6,935,948 | B2 | 8/2005 | Wright | |
| 6,969,067 | B1 | 11/2005 | Borruso | |
| 2001/0031661 | A1 * | 10/2001 | Wiltshire et al. | 463/26 |
| 2003/0013530 | A1 * | 1/2003 | Lauzon | 463/42 |
| 2003/0023547 | A1 * | 1/2003 | France et al. | 705/39 |
| 2003/0104853 | A1 | 6/2003 | Tessmer et al. | |
| 2004/0116176 | A1 | 6/2004 | Tulley et al. | |
| 2005/0014552 | A1 | 1/2005 | Packes, Jr. et al. | |
| 2005/0049027 | A1 | 3/2005 | Weiss | |
| 2005/0164768 | A1 * | 7/2005 | Wright | 463/17 |
| 2005/0164769 | A1 | 7/2005 | Wright | |
| 2005/0164770 | A1 | 7/2005 | Wright | |
| 2005/0165619 | A1 | 7/2005 | Wright | |
| 2005/0176490 | A1 | 8/2005 | Wright | |
| 2005/0215306 | A1 | 9/2005 | O'Donnell et al. | |
| 2005/0227759 | A1 | 10/2005 | Dolezal | |
| 2005/0261049 | A1 | 11/2005 | Borruso | |
| 2006/0009275 | A1 | 1/2006 | Packes et al. | |
| 2006/0019736 | A1 * | 1/2006 | Amada | 463/17 |
| 2007/0093298 | A1 * | 4/2007 | Brunet | 463/42 |
| 2007/0149271 | A1 * | 6/2007 | Gingher et al. | 463/17 |

OTHER PUBLICATIONS

Virtual World Direct e-Lottery Syndicate: Frequently Asked Questions. <URL: http://web.archive.org/web/20050112035816/http://www.virtualworlddirect.com/vwdguest/faq_ge.asp>. [dated Jan. 12, 2005] [online] [retrieved Mar. 22, 2008] [4 pages].*

Virtual World Direct Winnings Statement: Sample Statement. <URL: http://web.archive.org/web/20051030007460 3/www.virtualworld-direct.com/images/vwdinchq.jpg>. [dated Apr. 9, 2002] [online] [retrieved Mar. 22, 2008] [1 page].*

Lottery-Syndicate-World.com Why Should I Join a Syndicate? <URL: http://web.archive.org/web/20040926221716/www.lottery-syndicate-world.com/lottery-jackpot.html>. [dated Sep. 26, 2004] [online] [retrieved Mar. 21, 2008] [2 pages].*

Lottery-Syndicate-World.com What Are Lottery Syndicates? <URL:http://web.archive.org/web/20040926004630/www.lottery-syndicate-world.com/lottery-syndicates.html>. [dated Sep. 26, 2004] [online] [retrieved Mar. 21, 2008] [2 pages].*

Texas Lotto Club: Questions & Answers. [dated at least Dec. 6, 1998] [6 pages].*

* cited by examiner

METHOD AND SYSTEMS FOR SHARED-OWNERSHIP LOTTERY PLAYS

RELATED APPLICATION

This application is based on and claims the benefit of U.S. Provisional Patent Application Nos. 60/723,759 filed on Oct. 4, 2005, 60/757,301 filed on Jan. 9, 2006 and 60/791,675 filed on Apr. 12, 2006, the disclosures of which are incorporated herein in their entirety by this reference.

COPYRIGHT NOTIFICATION

Portions of this patent application include materials that are subject to copyright protection. The copyright owner has no objection to the facsimile reproduction by anyone of the patent document itself, or of the patent application as it appears in the files of the United States Patent and Trademark Office, but otherwise reserves all copyright rights whatsoever in such included copyrighted materials.

BACKGROUND

This invention pertains generally to systems and methods for selling lottery tickets. More particularly, it relates to a system and method for providing shared-ownership lottery plays, which can be used to promote lotto games. In some lotto games, the set of numbers X chosen by the player includes five numbers chosen from the universe or bank of numbers U, which includes numbers one to U, where U is substantially greater than five. In other lotto games, the player also chooses an additional number from a second bank or universe of numbers $U_2$, which includes numbers from one to $U_2$, and the lottery also draws an additional number, for a total of six numbers chosen by the player and six numbers drawn by the lottery. The jackpot is won if all numbers chosen by the lottery match the set of numbers selected by the player. Matching less than the maximum possible number of matches within the number set results in smaller prizes. The set of numbers X selected by the player can be referred to as a "number set," "board," "panel," "lottery play" or "play." A "lottery ticket" or "ticket" includes one or more lottery plays. Lotto games can also include other combinations of selections. The main element that defines a lotto game is that the player selects numbers from one or more universes of numbers and the lottery selects numbers from one or more universes of numbers with the prize or prizes being a function of the numbers that match between the player and the lottery.

It is important for state, provincial and other lotteries worldwide to sustain player interest in their lotto games and products that have been offered by the lotteries for years. Yet, sustaining player interest in these maturing lottery games and products, particularly in the large interstate jackpot games, has proven more and more difficult every year. For example, the Powerball™ and Mega Millions® games typically must now achieve a jackpot prize of $100 million to generate the same sales that were previously generated at a jackpot prize of $50 million. At every jackpot level below $100 million there is less and less player interest than there was a year or two prior, even after adding in the population base from new states joining these games.

Some of these lotto games, such as the Powerball™ and Mega Million® games, are sold under agreement between multiple states. Others are intrastate games, such as the Fantasy 5™ lottery game or The Pick™ lottery game offered by the Arizona Lottery or the Classic Lotto 47 game offered by the Michigan Lottery. For these games, the increasing dollar amount of the jackpot prize has been the primary focus point of marketing promotions in generating player interest and thus, in generating sales in the game. However, player interest in these games begins to wane as the players become jaded or apathetic to the jackpot prize, known in the industry as "jackpot fatigue," and after recognizing the increased difficulty of winning any significant prizes.

To regain player interest and increase sales, state lotteries have continually resorted to raising the jackpot and other prize amounts by increasing both the odds against winning and extending the life of the annuity option in the case of the jackpot prize. Because of the higher odds against winning, however, state lotteries are now faced with the additional negative marketing factor of increased elapsed time between wins for virtually every prize level, as well as player awareness of and disappointment with these higher odds. The latter has resulted in significant player abandonment of most lotto games either completely or until the jackpot reaches much higher levels.

For example, in the Powerball™ game and its predecessor game, Lotto America®, the odds against winning have been increased over time from approximately 19 million to one in 1988, to 26 million to one, to 80 million to one, to 121 million to one, to 146 million to one by 2005. Increasing the odds reduces the frequency of players winning the jackpot and other prizes, allowing the jackpot to grow larger. In addition to changing the size of the number set from which a player must select their numbers, another method that has been employed to increase the size of the jackpot has been the introduction of a second bank of numbers so that the prizes are based on matching one or more numbers from the first bank and one number from the second bank. This method increases the jackpot prize while simultaneously offering more combinations of winning, albeit for smaller prizes.

Extending the life of the annuity also permits a higher jackpot amount to be stated due to the time value of money. For example, $100 million in the bank today accruing interest at 7% and paid out over 20 years totals $189 million in payments, but over 30 years totals $242 million. The result is that the longer the payout, the higher the advertised jackpot. When made aware of this fact, however, players react negatively, particularly at a 30-year annuity, which can result in the cash value becoming less than half the advertised jackpot.

This currently-deployed and pervasive core marketing concept of raising the size of jackpots by raising the odds against winning is directly contributing to player apathy, fall-off, and abandonment, especially at lower jackpot levels. The long term result has been a continual decline in sales due to jackpot fatigue and disenchantment with the possibility of winning any significant prize. This same problem, although less pronounced, also exists with intrastate lotto games.

Therefore, there is a need for a new marketing method and system for lotto game promotions that reinvigorates player interest, incentivizes sales, does not require increasing the odds against winning, does not take away from the jackpot level, provides more players with significant prizes, and increases an individual player's chances of becoming a jackpot winner without lowering the odds of the game.

One object of the present invention is to provide such a method and system that can produce powerful sales incentives of: new options, easy access, more chances to win, and more play variety and excitement, in order to capture new players, recapture lost players, and re-energize current players to purchase more tickets.

Another object is to provide a method and system that gives the players more chances of winning more prizes of significant value. The two dominant inter-state games, for example, offer one jackpot prize which currently grows to over $100,000,000 every few months, a $250,000 (or $200,000) second prize, and a $10,000 third prize plus some smaller prizes of $150 and less. But, many players would be more than satisfied with a shared-ownership mode of playing that significantly increases their chances of winning, even though they would ultimately share any jackpot or smaller prize with others. For example, these players would be more than satisfied with having significantly more chances of winning millions or tens of millions of dollars, $25,000, $20,000 or even $1,000 than just one chance per dollar spent on winning a larger prize.

Another object is to provide a method and system that mitigates negative player reactions and fall-off when state lotteries increase the odds against winning in order to increase jackpots. The traditional method of just increasing the odds forces all players into choosing either the one mode of playing, or not playing at all. But by adding shared-ownership lottery plays to the mix, all players can choose a mode of playing that suits their personal tastes and interests. Thus, those who become disenchanted can offset the higher odds with more chances to win via their shared-ownership tickets.

Another object is to provide state lotteries with a marketing product and method of promotion that can invigorate interest and increase sales without requiring them to endure the inconvenience and expense of a game change. Currently, any change in a multi-state game affects all the participating states, and thus requires significant time, effort, and expense to accomplish. But, offering a shared-ownership lottery ticket according to the present invention does not require any game change and creates a brand-new marketing opportunity with dozens of promotional opportunities.

Still another object is to provide a marketing product and method of promotion that does not give away additional prize amounts or require discounts or giveaways, as is the case with many current "Buy This and Get That" lottery product promotions. With shared-ownership tickets according to the present invention, each such ticket generates the same amount of revenue as a non-shared ticket, and the incentive is not a discount, but the appeal of more chances to win at an affordable price. Therefore, there is no dilution of the revenue going into the prize fund relative to the total number of tickets sold.

Another object is to create a greater number of significant prize winners for the lottery, because more winners mean more goodwill and positive public relations via word-of-mouth and media coverage of winner's stories. For example, instead of one $100,000,000 winner there can be ten $10,000,000 winners, or instead of a single $200,000 or $250,000 winner, there can be ten $20,000 or $25,000 winners, or instead of a single $10,000 winner there can be ten $1,000 winners. The lottery will have significantly more exciting winners' stories to share in their advertising and for public relations, which contributes to their goodwill and is a key ingredient to growing sales.

Another object is to provide state lotteries with a marketing product and method of promotion that is completely parameter controlled by the individual state lottery itself. Thus, with shared-ownership tickets, unique marketing promotions can be created and controlled to target specific marketing objectives and better achieve desired results. Currently, there are no state-controllable marketing parameters within the traditional games. However, with the present invention, the state lotteries will have at least five controllable parameters that can be adjusted to affect demand for lottery plays without requiring changes in the game. These controllable marketing parameters are as follows: 1) the details of the qualifier; 2) the quantity of shared-ownership lottery plays; 3) the pricing of the shared-ownership lottery plays; 4) the timing of when the qualifier must be met, for example, by date, jackpot level or simply as announced; and 5) the option to offer the shared-ownership lottery plays at different times, such as when the qualifier is met, at a future date or at different jackpot levels.

Another object is to provide a variable and controllable incentive to promote any lottery product or program. For example, to incentivize players to become a member of a player club, sign up for a player card, promote pull-tabs, instant tickets, new products or to take a survey.

Another object is to provide players with the security and flexibility they have always wanted when pooling with others. A shared-ownership lottery ticket according to the present invention provides "pooling in a ticket," which is a vastly improved process over the traditional "office pooling" process. It eliminates the burden and potential risks of collecting money, tracking names, buying tickets, distributing photocopies of the tickets, overlooking winning combinations, player disputes, and collecting and distributing winnings. For the first time, players who want to participate in a pool of tickets no longer have to rely on the honesty or security of the ticket purchaser because they can now hold onto their own ticket(s). There will be no more controversy or legal actions, over issues like "Who is in and who is not," or "You forgot to put me in the pool" so often found with private pools, and each player can now decide how much to spend and when to spend it. Many members of office pools will now do their pooling with shared-ownership tickets, and business executives will be happy to avoid possible legal exposure and will see their employees spending less of the company's valuable time interacting with the office pool and using the company's copying machine, phones, and email systems. For the first time, players who pool using the present invention will receive the protection, security, and oversight of the state lottery.

Another object is to provide equal access and opportunity for all adult citizens who desire to participate. For the first time, the majority of current and potential lottery players, which includes independent workers, those working in small businesses and the retired, can receive access to the benefits of pooling without having to work in a large office, or other venue where employees or members put together lottery pools.

Yet, another object is to help protect the elderly and other vulnerable citizens. By offering shared-ownership lottery plays according to the present invention, state lotteries will remove the primary incentives used by lottery scam artists, and illegal out-of-country lotteries who solicit via the phone and Internet preying on the elderly and other vulnerable adults. For example, the US Postal Service intercepted over 1.4 million lottery letters in the fiscal year ending in 2006 and these are only a few of the letters that find their way through the US mails. In addition, the elderly are also preyed upon via boiler rooms and the Internet scams. The elderly are continuous targets of lottery scams offering them hundreds of chances of winning. With the present invention, the elderly will no longer have to turn to private parties to give themselves more opportunities to become a lottery winner.

Additional objects and advantages of the invention are set forth in the following description, and in part will be apparent from the description, or can be learned by practice or observation of the invention. The objects and advantages of the invention may be realized and obtained by means of the methods and apparatus pointed out in the appended claims.

SUMMARY OF THE INVENTION

To achieve the foregoing objects, and in accordance with the purposes of the invention as embodied and broadly described in this document, there is provided a new marketing product and promotional method that creates a new type of lottery transaction that provides shared-ownership lottery plays and shared-ownership lottery tickets.

According to one aspect of the invention, a method for providing shared-ownership lottery play using a computer system includes: storing shared-ownership lottery play information including one or more lottery plays available for shared ownership for a selected game and drawing date; receiving a request for one or more shared-ownership lottery plays for the selected game and drawing date; and using the stored shared-ownership lottery play information to issue one or more shared-ownership lottery plays in response to the request. Each of the one or more issued shared-ownership lottery plays is selected from the one or more lottery plays available for shared ownership, and the ownership of each of the one or more issued shared-lottery plays is assigned an ownership percentage increment of less than 100 percent.

The step of issuing the one or more shared-ownership lottery plays can include generating a receipt representing an ownership percentage in each of the one or more shared-ownership lottery plays equal to the assigned ownership percentage increment. Generating the receipt can include printing one or more lottery tickets representing the one or more shared-ownership lottery plays. Generating the receipt also can include generating an electronic receipt representing the one or more shared-ownership lottery plays.

The step of issuing the one or more shared-ownership lottery plays can be conditioned on issuing at least one full-ownership lottery play. Similarly, the step of issuing the one or more shared-ownership lottery plays can be conditioned on the request for or the purchase of another lottery product or service that is not a full-ownership lottery play.

According to another aspect of the invention, the total assigned ownership percentage for any one of the one or more issued shared-ownership lottery plays can be either homogeneous or heterogeneous ownership percentage increments, or a combination thereof. The step of using the stored shared-ownership lottery play information to issue one or more shared-ownership lottery plays can include issuing a plurality of shared-ownership lottery plays wherein the assigned ownership percentage increment does not have to be the same for all of the issued shared-ownership plays.

According to another aspect of the invention, the request for the shared-ownership lottery plays can also include a request for one or more full-ownership lottery plays for a selected game and drawing date, and the method can include issuing one or more full-ownership lottery plays in response to the request. Issuing the one or more shared-ownership lottery plays and issuing the one or more full-ownership lottery plays can include generating one or more receipts representing a partial ownership percentage in each of the one or more shared-ownership lottery plays and also representing full ownership in the one or more full-ownership lottery plays. Generating the one or more receipts can include printing one or more lottery tickets representing the one or more shared-ownership lottery plays and the one or more full-ownership lottery plays. Generating the one or more receipts also can include generating one or more electronic receipts representing the one or more shared-ownership lottery plays and the one or more full-ownership lottery plays.

According to another aspect of the invention, the stored shared-ownership lottery play information can include an open cap on the number of shared-ownership lottery plays that will be made available by the lottery at a given time for the selected game and date. The method can include determining whether to issue the one or more requested shared-ownership lottery plays based on the open cap. The purpose of the open cap is to limit the lottery's exposure to unfilled lottery plays. The lottery can place a cap on the number of shared-ownership lottery plays that it will allow to be open to the public at any one point in time in order to reduce the possible number of unfilled shared-ownership lottery plays by the time the drawing deadline takes place. The open cap may be a fixed number or it may be varied. For example, the cap may be lowered as the time to the drawing gets nearer.

According to still another aspect of the invention, the request can include a tracking identifier which can be stored with the shared-ownership lottery play information. Determining whether to issue the one or more requested shared-ownership lottery plays can be based on the tracking identifier. The purpose of the tracking identifier is to protect the player from receiving multiple ownership interests in the same lottery play or plays resulting from multiple requests.

The requested shared-ownership lottery plays can be issued if the open cap is greater than or equal to the number of requested shared-ownership lottery plays and the number of open lottery plays without a matching tracking identifier is greater than or equal to the number of requested shared-ownership lottery plays. The requested plays also can be issued if the open cap is greater than or equal to the number of requested shared-ownership lottery plays, and the open cap less the open plays with the matching tracking identifier is greater than or equal to the number of requested shared-ownership lottery plays.

The tracking identifier can be issued by the lottery so that each player is associated with a unique tracking identifier such as a player identification card. The identifier can also be printed on a lottery ticket with the player's first purchase so it can be scanned by the lottery terminal previous to the player's next lottery purchase. Unique identifiers could also be preprinted on disposable forms, available at the retailer's counter to be picked up at will by a player and retained for use when requesting the shared-ownership lottery plays.

According to another aspect of the invention, duplication of shared ownership can be limited without a tracking identifier if receiving subsequent contiguous requests for one or more shared-ownership lottery plays for the selected game and drawing date from a given input source. Using the stored shared-ownership lottery play information to issue a next shared-ownership lottery play, each subsequent shared-ownership lottery play can be selected by sequencing or rotating through the one or more available shared-ownership lottery plays for the selected game, date and ownership increment; whereby the uniqueness of each subsequent issued shared-ownership lottery play is guaranteed up to a predetermined number of lottery plays.

BRIEF DESCRIPTION OF THE DRAWINGS

The accompanying drawings, which are incorporated in and constitute a part of the specification, illustrate the presently preferred embodiments of the invention and, together with the general description given above and the detailed description of the preferred methods and embodiments given below, serve to explain the principles of the invention.

DESCRIPTION

In the following description, methods and embodiments of the invention have been shown and described simply by way of illustration of the best mode contemplated by the inventor of carrying out the invention. As will be realized, these methods and embodiments can be modified in various respects, all without departing from the invention. Accordingly, the drawings and description are to be regarded as illustrative in nature, and not restrictive.

The method and system of the invention can be used by state lotteries to implement a new form of lottery transaction that is based on shared-ownership lottery plays versus the current limited choice of only non-shared ownership lottery plays. For purposes of this specification, it will be understood that a "lottery play" is a number set, board, panel, group of numbers or the like, which are compared to a set of numbers drawn or selected by a lottery to determine whether or not there is a sufficient match to award a prize. A lottery ticket can evidence ownership of one or more lottery plays. The shared-ownership lottery transaction is legally and physically different than previously known lottery transactions, yet it can apply to any lotto game. It can be manifested as a shared-ownership lottery ticket, which is different than the current non-shared ownership lottery ticket, or it can be manifested electronically to a computer screen, telephone, etc, resulting in a unique and useful marketing product, business method and process, and business application.

Figure 1:
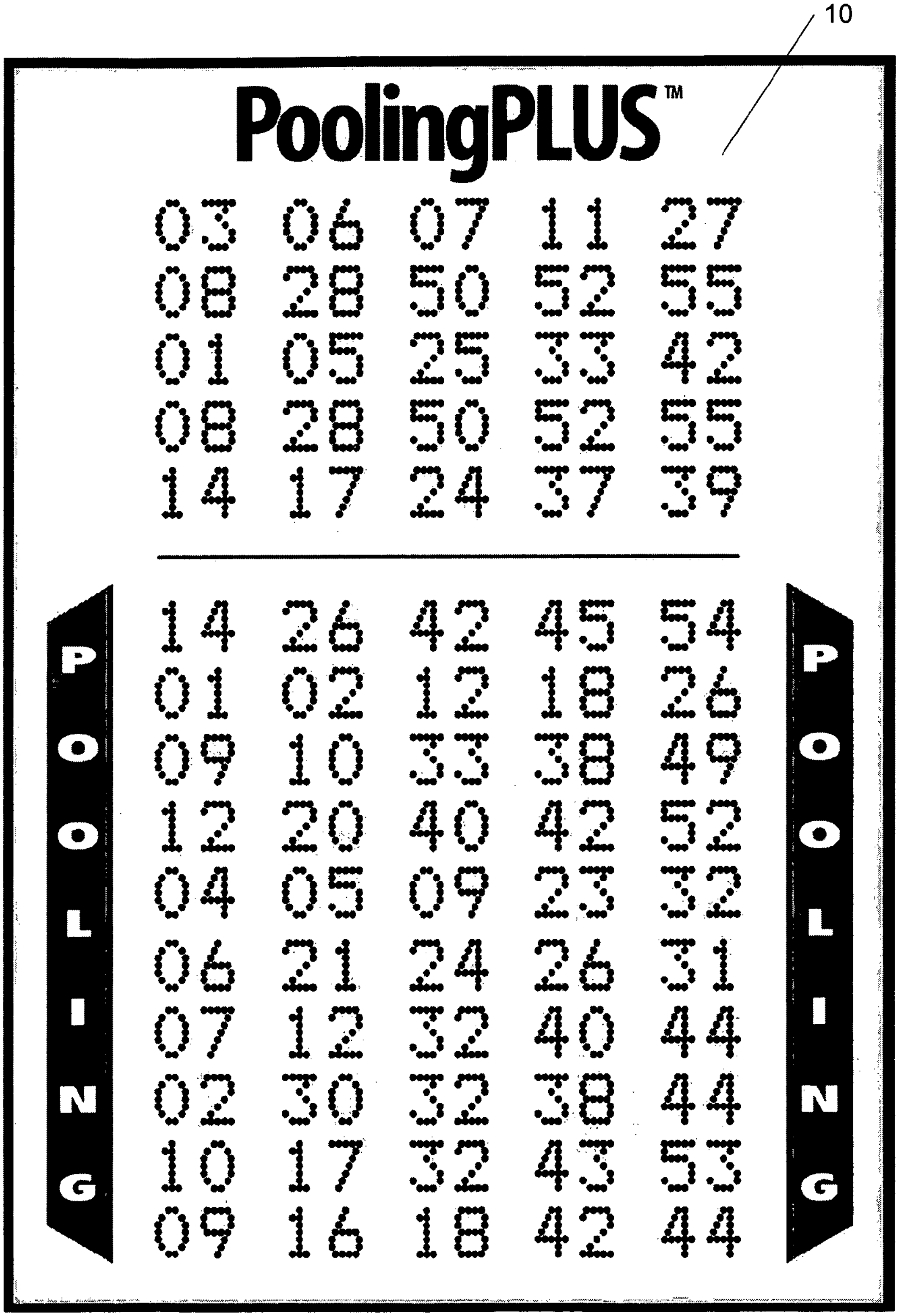
FIG. 1 shows an example of a shared ownership lottery ticket according to the present invention.

Thus, according to one novel aspect of the invention, a lottery player can purchase shared-ownership lottery plays. The shared-ownership lottery plays can be purchased via traditional lottery terminals or through kiosks, the Internet, the telephone or any other wired or wireless technology. At the moment of purchase, the purchaser's shared-ownership lottery plays as well as any lottery plays that are not shared can all be printed on a single lottery ticket or they can be printed on multiple lottery tickets. Thus, for example, from the same purchase, the player could receive multiple tickets with one ticket representing ten shared-ownership lottery plays, one ticket representing five shared-ownership lottery plays and one ticket representing any lottery plays not being shared. Alternatively, the lottery could choose to print all the plays on a single ticket. FIG. 1 depicts an example of a shared ownership lottery ticket that represents ten shared-ownership lottery plays and five non-shared lottery plays. The lottery may also choose to print a combination of tickets from the same transaction, with each ticket representing one or more of the non-shared lottery plays and one or more of the shared-ownership plays. For example, in one transaction, a player may buy 10 non-shared lottery plays, and 100 shared-ownership plays. Instead of printing one ticket with 110 plays, the lottery may print 10 tickets with each ticket containing one non-shared ownership play and 10 shared-ownership plays.

The lottery can group shared-ownership plays into "pools" of multiple such plays, which can be offered for sale. For example, the lottery may want to promote pools of 5, 10 or 20 shared-ownership lottery plays for $1. Pre-grouping the plays into pools in this manner could be beneficial to the lottery, such as reducing the time to search for plays to fill a player request for shared-ownership plays. For instance, using an example of a pool size of ten shared-ownership plays, the lottery's software could internally generate and store one or more pools of ten plays each and could assign each pool of plays a single unique pool number. Grouping the plays into pools, ten in this example, would reduce the search time by a factor of ten when a player requests a pool of ten plays.

The lottery may choose to also offer variable ownership structures, whereby transactions can include any combination of variable pool sizes and variable ownership increments. For example, a given transaction could include two pools of ten plays, with the player purchasing a 10% ownership in one pool for $1 and a 20% ownership in the other pool for $2. For another example, the transaction can include a pool of 100 shared-ownership plays for $2 and a pool of 50 shared-ownership plays for $2.50 providing a 2% and 5% ownership share, respectively. The pricing in this and all other examples assumes a 100% owned lottery play is priced at $1. Further, that same ticket could also represent one or more lottery plays, of which the bearer owns 100%.

Further, if the lottery is using the shared-ownership lottery plays as an incentive to promote the purchase of another product or for the person to take some action, an acknowledgement of the qualifying purchase of the other product or the action can be printed on the ticket along with the shared-ownership lottery plays. For example, if the qualifying purchase is a minimum number of scratch tickets, this part of the sale could be represented on the same ticket as the shared-ownership lottery plays. Similarly, if the qualifier is an action, such as joining the lottery's VIP club, this too could be printed on the same ticket as the shared-ownership lottery plays.

Figure 2:
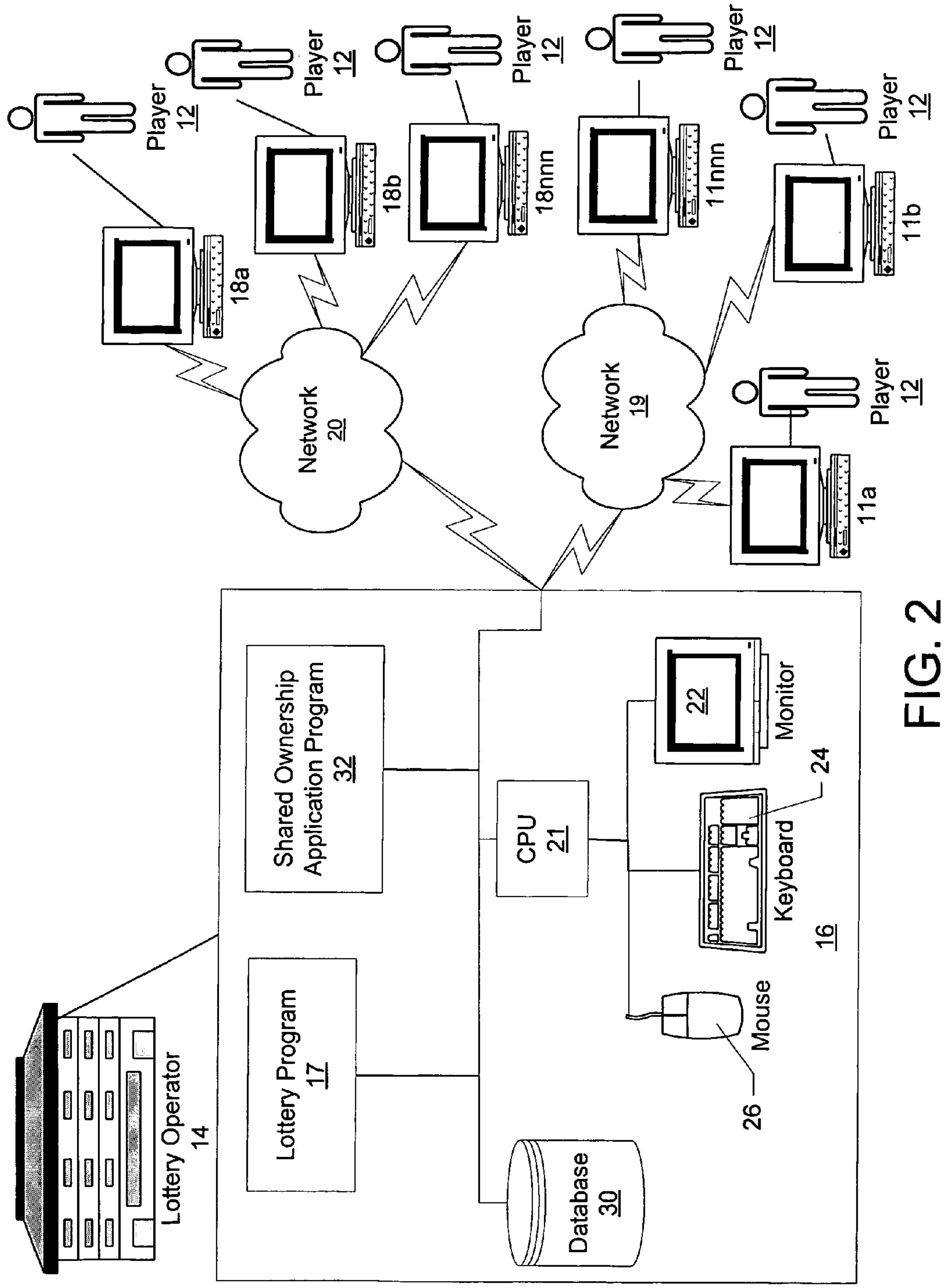
FIG. 2 is a functional block diagram of a preferred lottery computer system and a network for practicing the present invention.

FIG. 2 illustrates a preferred computer network system for providing shared-ownership lottery play according to the present invention. The system includes a lottery computer system 16. The lottery computer system 16 stores and processes information regarding shared-ownership lottery plays and requests to purchase such lottery plays, as described below. In a presently preferred embodiment, the lottery computer system 16 also can include a lottery program 17 for tracking each ticket that is issued with a single transaction serial number, as is known in the art. The lottery computer system 16 is operated by a lottery operator 14, which can be a governmental entity, such as a state lottery, or a representative of a state. One example of a lottery operator that is a representative of a state is the Georgia Lottery Corporation, which is referred to as a quasi-state agency and which runs the lottery for the state of Georgia. The lottery operator 14 also can include a third-party provider that operates the lotto games for a state or other governmental entity. Players 12 can purchase lottery plays via a lottery terminals 11*a*, 11*b* and 11*nnn*, (where nnn refers to any number of lottery terminals) coupled to the lottery computer system 16 via a network 19 other suitable communications means. Players also can purchase lottery plays via user computers 18*a*, 18*b*, 18 *nnn* coupled to the lottery computer system 16 via a computer network 20, such as the Internet, or by telephone or other suitable communications means.

Still referring to FIG. 2, the lottery computer system 16 includes a central processing unit (CPU) 21 for processing data and program instructions. The computer system 16 also includes input and output devices, as is well known in the art. For example, the computer 16 preferably includes a display screen or monitor 22, a keyboard 24, a mouse 26, a printer (not shown), etc. The computer system 16 further includes data storage and memory devices, as are known in the art, for storing a database 30. The database 30 is used to store lottery data, as well as shared-ownership lottery play information and the pooling information described below. Preferably, the database 30 is a relational database, as is well known in the art. A shared ownership application program 32 is operable with the database to provide the functionality described below.

The lottery computer system 16 is connected to the network 19, which serves as a communications medium with lottery terminals 11*a*, 11*b*, 11 *nnn* and the lottery computer system 16. In a preferred embodiment, the lottery computer system 16 is also is connected to the network 20, which serves as a communications medium for user computers 18*a*, 18*b*, 18 *nnn* (where nnn refers to any number of users) and the lottery computer system 16. In a preferred embodiment of the invention, the network 20 comprises the Internet. The Internet is a global network of computers. One popular part of the Internet is the World Wide Web, or the "Web." The World Wide Web includes computers that display graphical and textual information. A "website" is defined by an Internet address that has an associated electronic page, often called a "home page." Generally, a home page is an electronic document that organizes the presentation of text, graphical images, audio and video into a desired display. Upon reading this specification, those skilled in the art will now understand that, under appropriate circumstances, considering issues such as developments in computer hardware, software and connectivity, etc., other network configurations and devices also may suffice, such as for example, PDAs connected via a wireless network, etc.

The manifestation of the shared-ownership lottery plays can be a printed lottery ticket 10, which can be printed at a lottery terminal 11, can be displayed on the player's computer 18, can be printed remotely on a printer (not shown) connected to the player's computer 18, or can be displayed as an image file, email, or any other format on any other device, electronic or otherwise. It can also be displayed on a monitor, TV set, telephone, PDA or any wired or wireless technology, via the Internet or other communication network.

At the time the player makes a purchase, the lottery operator 14 may wish to search for each lottery play to be shared from a bank of individual lottery plays designated to be shared, or it may have predetermined the lottery plays to be shared and assigned each to a single unique pool number, thereby reducing the search time significantly. Predetermination of the pool of shared lottery plays can be achieved by pre-assigning the groups of individual lottery plays to a single unique pool number before the demand for the lottery plays is presented, or it can be achieved by assigning each of the lottery plays to a single unique pool number as the demand for the lottery plays presents itself. For example, if the lottery's pricing and quantity of lottery plays to be shared for a given game, given drawing date and with Y percentage ownership increment is ten plays, then one or more groups of ten lottery plays could each be assigned a single unique pool number and the search time would be reduced to one-tenth of the original search time, since the ten lottery plays would already be grouped and referenced by a single pooling number. In either case, the lottery computer system 16 would keep track of the ownership percent of all shared-ownership lottery plays to prevent any shared lottery play from becoming oversubscribed.

If there are shared-ownership lottery plays that are not 100% subscribed to before the drawing cutoff time, (a) the state could own the unsubscribed ownership in the pool so that any share of winnings would go to the lottery's unclaimed prize fund, be designated to the fund future prizes, or be directed to benefit whatever the lottery chooses within their specific rules; (b) the state would be able to assign the unsubscribed ownership to one or more of the lottery's beneficiaries; or (c) the state would be able to assign the unsubscribed ownership to be used as part of a promotion, which could be paid for under the marketing budget. The unassigned ownership can also be assigned to those players who are sharing the assigned lottery plays that are not fully subscribed. The lottery may also consider the unsubscribed portion to be simply unsubscribed, so that the unsubscribed portion of any winnings would be retained by the lottery for future prize payouts. The lottery can take steps to reduce the number of lottery plays that are less than 100% subscribed. The easiest is to program the software to open as few pools as necessary to accommodate player demand, and on drawing days limit the number of new pools to be opened or even end the opening of new pools at some time period before the purchase deadline, so that any remaining pools will be filled prior to the drawing. Regardless of what the lottery chooses to do with unassigned positions in shared-ownership plays, the significance of the unassigned portion should be infinitesimal as it should amount to just a few dollars for the remaining plays out tens of thousand or hundreds of thousands of sharing dollars received.

The software that manages the lotto transactions can be programmed to not allow the purchase of shared-ownership lottery plays unless the transaction includes a qualifying purchase or other actions. For instance, only if the player meets the qualifying event, such as purchasing five non-shared tickets, or five instant tickets or joining a club, would the software subroutine trigger the eligibility of the shared lottery plays. The software can also be programmed to allow the purchase of shared-ownership tickets without any qualifying purchase.

The software can include variable parameter controls so that the lottery can control all aspects of the shared-lottery play transaction. The lottery could be able to control: 1) the details of the qualifier; 2) the quantity of shared-ownership lottery plays; 3) the pricing of the shared-ownership lottery plays; 4) the timing of when the qualifier must be met, for example, by date, jackpot level or simply as announced; and 5) the option to exercise the shared-ownership lottery plays at different times, such as when the qualifier is met, at a future date or at different jackpot levels.

As an example of controlling the qualifier details, the program can have a controllable parameter for the minimum qualifying purchase of non-shared lottery plays, which can be programmed to accept $1, $2, $5, $10, etc. as the minimum purchase. The qualifier can also be joining a players club, taking a survey, purchasing some other lottery product or anything the lottery wants to promote.

As an example of controlling the quantity of shared-ownership lottery plays, the software can be set to provide one or more ownership structures. Thus, the lottery can offer a shared pool of 5, 10, 20 lottery plays, etc. It can offer just one pool or it can offer multiple pools so the player can receive a share in 5 lottery plays plus a share in 20 lottery plays, or it can offer multiple pools of plays of the same size, for example, five pools with each pool consisting of ten lottery plays.

As an example of controlling the pricing of shared-ownership lottery plays, the program can price both a pool of 5 plays and a pool of 10 plays at $1 per pool so that a player purchasing an interest in a shared-ownership pool would own a 20% and 10% share, respectively. The pool of 10 shared-ownership plays can also be priced, for example, at $0.50, with the ownership interest being half of what the $1 would purchase, or $2.00 per pool, with the ownership interest being twice that which the $1 would purchase. Thus, at $0.50, a player would have $1/20^{th}$ or a 5% ownership in each of the 10 plays in the pool. And, if the price were $2, for the pool, the player would have a $1/5^{th}$ or a 20% ownership in each of the 10 plays in the pool.

As an example of controlling the timing of when the qualifier must be met, the software can have a date, date range, or jackpot level parameter for when the qualifying event must be met. For example, the lottery may require that the qualifier be met immediately after a jackpot is won, when the jackpot is at its lowest point when sales are the lowest, or the offer could be until the jackpot reaches a certain level. The qualifier date can also be an open date, meaning that the offer applies to any drawing date.

As an example of controlling the option to exercise the shared-ownership lottery plays at different times, as part of the lottery's promotion, the player may receive an option to exercise the shared-ownership lottery plays at a future date, within a date range or there could be an open date (meaning at anytime), on or before a set date. The lottery may also specify different jackpot levels during which the option must be exercised. For example, many players may not want shared-ownership lottery plays when the jackpot is at its lowest level and may prefer to exercise their right when the jackpot is larger, so the lottery might set a future date or date range for when the shared-tickets could be purchased, in which case the players might receive a "pooling pass." The lottery can also require that the shared-ownership plays be purchased for the same drawing night as the non-shared plays.

Shared ownership plays can be used as an incentive to increase ticket sales to individual players, because (1) the players now have more chances to become a winner and more options of how to play; and (2) they can have variable ownership structures, thus providing more entertainment, more variety and more ways of playing the lottery. The state lottery can also offer shared-ownership lottery plays as an incentive to motivate individual players to purchase a qualifying minimum amount of non-shared lottery plays, or other lottery products. For example, only if a lottery player purchases five non-shared lottery plays for $5, would they be eligible to purchase shared-ownership in 10 lottery plays for just an extra $1. Aspects of the invention can be controlled by the lottery in several ways in order to help increase and manage lottery sales. The lottery plays, for example, can be for the same game or for different games. The lottery can vary the minimum number of non-shared lottery plays that must be purchased, the number of shared-ownership lottery plays that the purchaser can obtain, when the shared-ownership lottery plays can be obtained, and the timing of the offer, for example, at what jackpot amounts the qualifying offer is available.

Shared-ownership lottery plays can be used as leverage to incentivize multiple lotto ticket purchases. For example, if a player buys five regular lotto tickets, for an extra dollar they can get into a pool of ten more tickets—that's 15 chances to win for the price of six! In this example, players would not get the pooling until they buy the required amount of 100%-owned lotto tickets. While many players have a high interest in pooling, unless there is an office pool where they work, most players don't have any access to pooling. Pooling using the system and method of the present invention eliminates all of the traditional hassles of putting the pools together, determining who is in the pool and who is not, collecting the funds and managing the pool, plus it's backed by the security and reliability of the lottery. It can give players who have lost interest something exciting to get them back into the game again—an affordable way to get more chances to win. And, it will give the lottery a powerful new incentive that can easily be turned into dozens of possible promotions to keep players interested and excitement building over time across all jackpot levels.

The invention can be used to provide numerous promotions. Here are examples of just a few promotions with completely different marketing objectives:

PROMO 1—THE LAUNCH: As a launch promo with a strategy to generate trial, the lottery could offer a promotion: "Buy two (or more) regular lottery tickets and for an extra dollar get into a pool of ten more tickets—that's 12 chances to win for the price of 3!"

PROMO 2—INCREASE EARLY PLAY: As a strategy to increase lotto sales just after a jackpot is won, the lottery could run a promotion: "Until the Jackpot reaches $25 million, buy one (or more) regular lottery tickets and for an extra dollar get into a pool of ten more tickets—that's 11 chances to win for the price of two. Hurry, this offer expires the minute the estimated jackpot hits $25 million!" With this incentive, many players who have dropped out of lotto games will be attracted back to take advantage of the pooling, many current players will increase their normal after-jackpot purchases by $1, and those who normally hold off until the jackpot gets much higher will start playing sooner than ever before.

PROMO 3—BIGGER CARROT, BIGGER PRICE: As the jackpot goes over a certain amount, say $75 million, when players would "normally" start getting more into the game, the promotion could be: "Buy 10 (or more) regular lottery tickets, and for an extra five dollars, get into five pools of ten more tickets each. That's 60 chances to win for the price of 15!"

PROMO 4—LAUNCH OR INCENTIVIZE ANYTHING: The lottery can also incentivize or increase sales of almost any lottery product. For example, to launch a new scratcher the promo could be: "Buy two new Godzilla meets King Kong scratcher tickets, and for an extra dollar you can get into a pool of 10 Powerball tickets!" Even the lottery's VIP players' club could get a boost from a promo, such as: "Join the lottery's new VIP club, and for only a buck get into a pool of ten state lotto tickets!"

Figure 3:
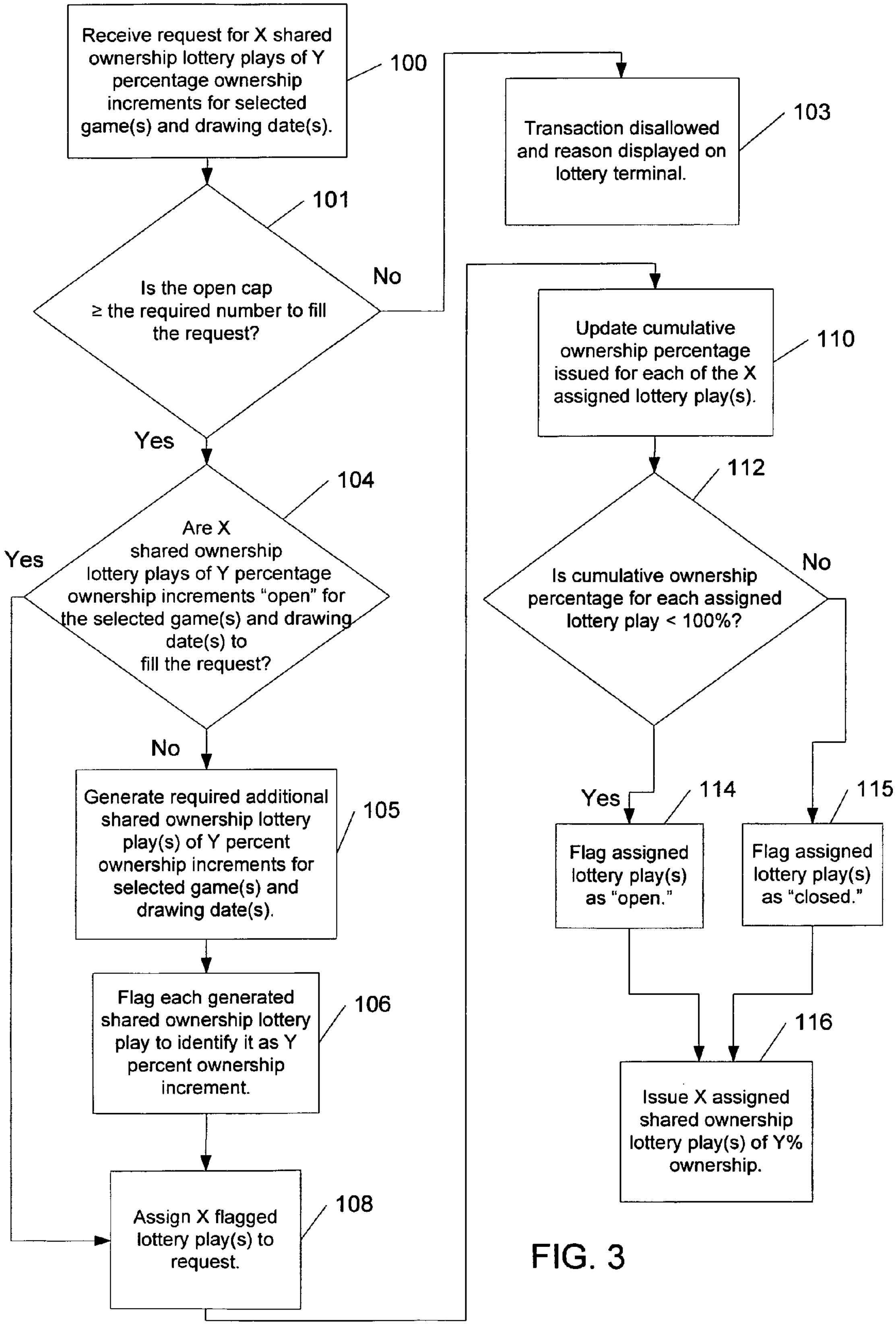
FIG. 3 is a block diagram depicting one method for providing shared ownership lottery play according to the present invention, wherein the method incorporates the use of an open cap without a tracking identifier.
Figures 1, 4:
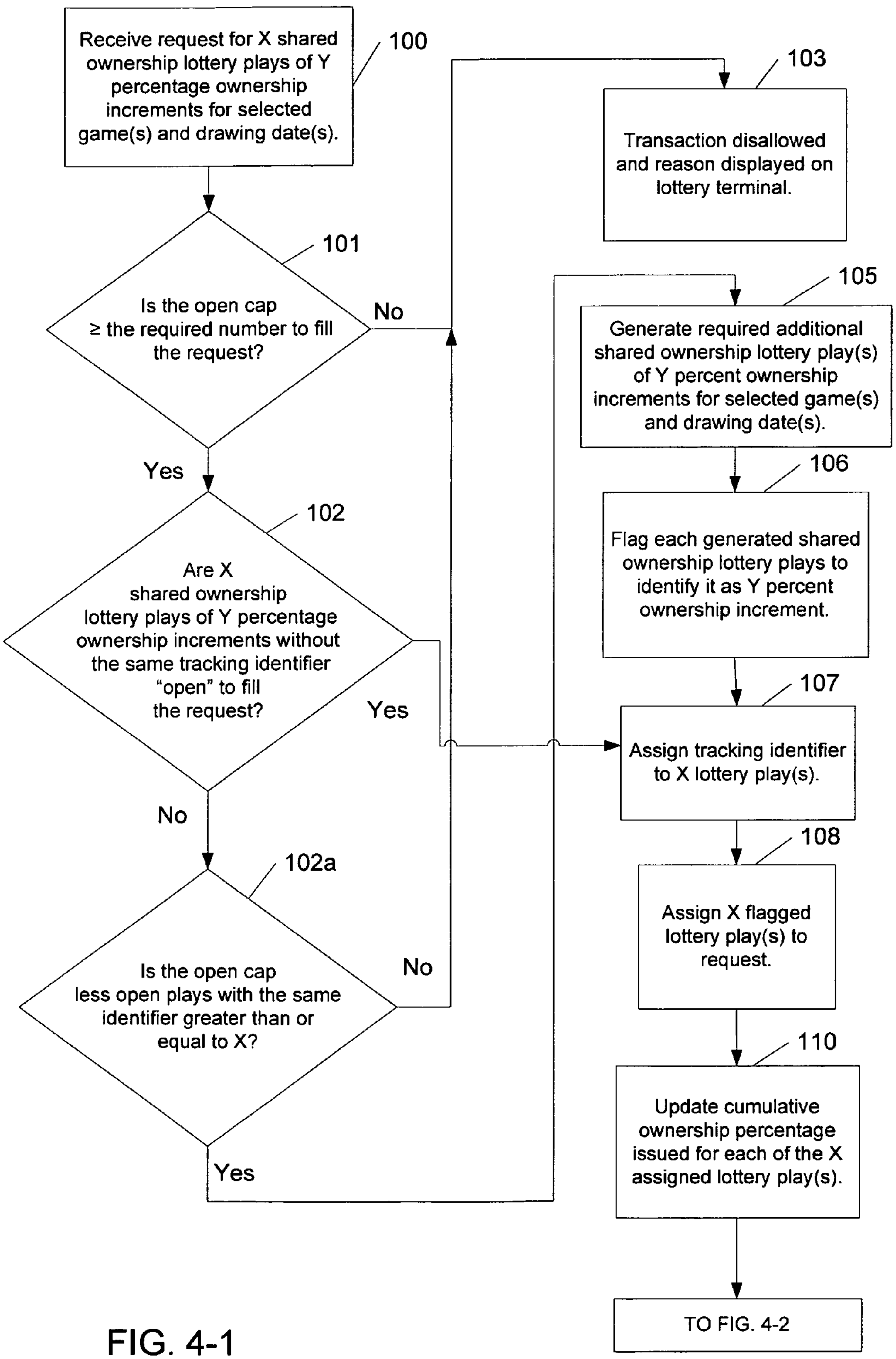
FIG. 4 is a block diagram depicting another method for providing shared ownership lottery play according to the present invention, wherein the method incorporates the use of an open cap and a tracking identifier.
Figures 2, 4:
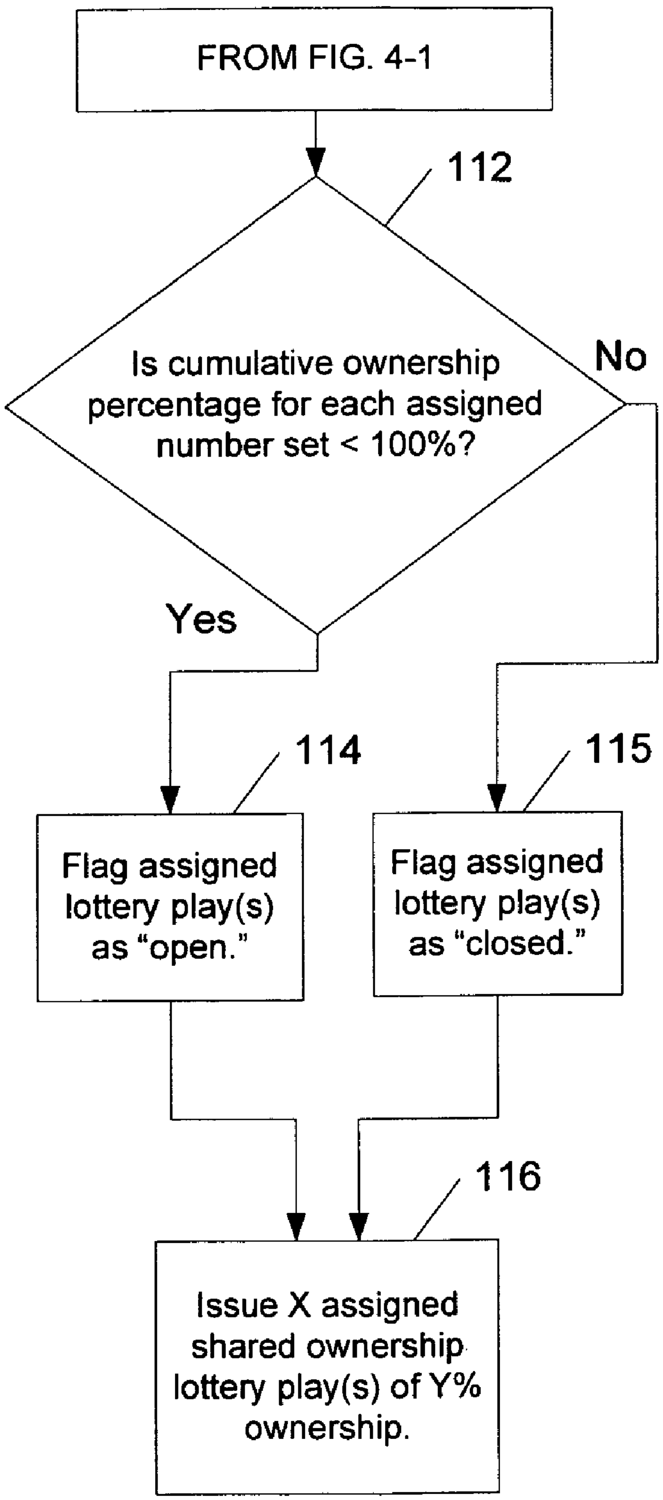

FIGS. 3-4 depict exemplary methods for providing shared ownership lottery play according to the present invention. For purposes of explaining these methods, it will be understood that an "open" lottery play is one that has been identified (e.g., flagged) as being available for sharing because it has not been fully filled or subscribed. Also, for ease of explanation, the term "play" will be used, however, in practice "play" can mean either a single play, or a pool of plays grouped together as a set, as previously explained.

FIG. 3 depicts an example of a process for filling a player's request for shared-ownership lottery plays without regard for the possibility of multiple entries by the same player into the same shared-ownership lottery play(s) if the player requests shared-ownership plays at different lottery terminals or through the same lottery terminal but at different times. FIG. 3 also depicts an example of the use of an "open cap" by the lottery to limit its exposure to having too many unfilled pools. The open cap limits the number of different pools that are available at any point in time, which also limits the number of pools a player can purchase before receiving duplicate assignments to one or more of the pools. Referring to FIG. 3, the lottery computer system 16 receives a request to purchase one or more shared ownership lottery plays (designated by the variable X) of a given percentage ownership increment (designated by the variable Y, and which is be set by the lottery) for a selected game or games and drawing date or dates (step 100). The shared-ownership application program 32 then determines whether the maximum allowable number of open lottery plays of Y percentage ownership increments (i.e., the open cap) is greater than or equal to the number of lottery plays required to fill the request (step 101). If not, the requested transaction is disallowed (step 103). If so, the shared ownership application program 32 then determines whether the requested number of shared-ownership lottery plays, i.e. X such plays, for the selected game(s) and drawing date(s) are available (open) to fill the request (step 104). One reason that the requested number of shared-ownership lottery plays may not be allowable is that the lottery may choose to reduce the number of such plays that it will keep open as the cut-off time for the lottery drawing gets closer in order to minimize the number of possible unfilled plays. Thus, by the time a player makes a request, the requested number of shared-ownership plays may not be available. It should be understood, that the lottery is not required to have an open cap in connection with the present invention. To protect the lottery, however, an open cap is implemented as shown in FIG. 3 to limit the lottery's exposure to potentially unassigned plays. If the lottery allowed players to request an unlimited number of shared-ownership plays in a single transaction, the lottery could risk opening too many plays which may never get assigned. For example, the player may request 500 or 1,000 shared ownership plays. With an open cap the lottery limits the number of shared-ownership plays being offered in a single transaction and although the player can still make separate multiple requests for shared-ownership plays, the player would be risking assignment to the same lottery plays more than one time.

If sufficient shared-ownership lottery plays are not available to fill the request (step 104), the shared-ownership application program 32 generates additional shared-ownership lottery plays of Y percent ownership increments to fill the request for the selected game(s) and drawing date(s) (step 105). The shared-ownership application program 32 can do this, for example, by making a call to a random number generator to create the required number of lottery plays. As each shared-ownership lottery play is generated, it is flagged to identify it as a Y percent shared-ownership increment lottery play (step 106). After a sufficient number of additional shared-ownership lottery plays of Y percent shared-ownership increment has been generated and flagged as shared, the shared-ownership program 32 then assigns X flagged lottery plays to the request (step 108). This can be achieved by using the unique transaction serial number that is assigned to each lottery transaction, as is the currently known in the lottery practice, which is printed on the lottery ticket received by the purchaser. Thus, the lottery's software can associate with the assigned shared-ownership lottery play or pool of plays the same transaction serial number that is assigned to the ticket. With each purchase, the software can then increment the ownership percent of the shared-ownership pool by the applicable shared-ownership increment Y. Once the cumulative ownership for a shared-ownership play or pool of plays reaches 100%, it is then flagged as closed, as described below.

Referring again to step 104, if there are a sufficient number of shared-ownership lottery plays available to fill the request for the selected game(s) and date(s), the shared-ownership application program 32 assigns X flagged lottery plays to the request (step 108) without performing steps 105 and 106.

After assigning X flagged lottery plays to the request (step 108), the shared-ownership application program 32 updates the cumulative ownership percentage issued for each of the X assigned lottery plays (step 110). For example, if the ownership percentage increment for an assigned play is 10% (i.e., Y=10%), the program computes a cumulative issued ownership percentage for that lottery play by adding another 10% ownership to the lottery play, bringing the cumulative ownership of the lottery play to 20%. If the cumulative ownership percentage for an assigned lottery play is less than 100% (step 112), the shared-ownership application program 32 flags the assigned lottery play as "open" to indicate that it is not yet fully subscribed (step 114). If the cumulative ownership percentage for an assigned lottery play is not less than 100% (step 112), the shared-ownership application program 32 flags the assigned lottery play as "closed" to indicate that it is fully subscribed (step 115). The shared-ownership program can then issue the assigned shared-ownership lottery play to fill the request (step 116). This can be achieved, for example, by sending a command to the appropriate lottery terminal 11 or to a user's computer 18 to issue a shared-ownership lottery ticket 10. The shared-ownership lottery ticket 10 represents a Y percentage ownership of the assigned shared-ownership lottery play and can include appropriate terms specifying that the bearer of the ticket is sharing the ownership of each shared-ownership lottery play(s) listed on the ticket and is entitled to Y percent of the prize won with each such shared-ownership lottery play. Upon reading this specification, it will be understood that the percentage Y also can be expressed as a fraction, e.g. $1/5^{th}$ or $1/10^{th}$ etc.

The risk of duplicate assignments of a given shared-ownership play or pool of plays to a given player under FIG. 3 can be reduced in three ways. The first method applies if the player purchases in one transaction all of the shared-ownership plays that the lottery makes available at a given time. According to this method the lottery program can avoid duplication by selecting, for example, 10 or 20 different lottery plays with a single retrieval selection.

The second method applies if the player is allowed to have separate transactions, but done contiguously (i.e., serially in time at the same terminal, computer, URL or other source). According to this method, each available lottery play to be shared would be pre-identified with a rotation number. For example, the lottery might allow 100 shared-ownership plays to be open at any one time, with each play offering a 10% ownership increment, and a player, for example, could request up to twenty of those plays at any one time without duplication. Each shared-ownership play would be identified with a rotation number, for example "1" through "100." The lottery terminal would assign all plays in order of the rotation that has been assigned. Thus, if the request were for 10 plays, the first assignment would be to play "31", if the previous transaction was assigned to play "30", then to play "32" then to play "33" and so forth until it reached play "40". The next transaction at that terminal would start with play "41" and after assigning play "100," the terminal would start over at play "1." As each request for a shared-ownership play gets filled, and if the lottery wants to maintain the same number of available shared-ownership plays, it can replace the assigned shared-ownership play with another shared-ownership play with the same rotation number. If the lottery wants fewer shared-ownership plays available, which it might do as the time for the drawing gets closer, it can choose to leave that rotation number empty. In this way, when the system searches for available shared-ownership lottery plays, the search will skip to the next rotation number. With this method, it won't matter if the transactions are separately entered, as long as they are entered at the same terminal and entered contiguously.

The third method for avoiding duplicate assignments of shared-ownership plays is to search through the available shared-ownership plays based on a sequential number that can be assigned to each available shared-ownership play or pool of shared-ownership plays as it is created. For example, if there are 100 shared-ownership plays, they can be numbered 1 through 100, and as they are assigned to fill player requests, new shared-ownership plays can be created starting at 101. As described in the second method discussed above, the terminal can store the number of the last shared-ownership play assigned and pick up where it left off starting with the next sequential number.

The exemplary method of FIG. 3 does not include steps to prevent an individual player from being assigned to the same shared-ownership plays more than once if the player makes his or her purchase from different terminals or even from the same terminal if done at different times (i.e., if the purchases are not contiguous). If the lottery wishes to do so and if the player is concerned, the shared-ownership application program 32 can track each player's participation using a tracking identifier. This method is covered in FIG. 4. Thus, to avoid duplication, the player may be required to submit a player identification card, a disposable pooling card, or a previous lottery ticket which could include a specially printed tracking identifier. The tracking identifier would then be scanned as part of the transaction to make sure that the player is not already assigned to a shared lottery play to which they are about to be assigned.

FIG. 4 depicts an exemplary method for providing shared-ownership lottery plays according to the present invention, which incorporates the use of an open cap and a tracking identifier to prevent duplicate assignments. Even with the method of FIG. 4, the player still can purchase more shared-ownership lottery plays without the tracking identifier or by using a different tracking identifier, if permitted by the lottery, but the player risks duplicate assignment of one or more specific shared-ownership lottery plays to him or her. Referring to FIG. 4, the lottery computer system 16 receives a request to purchase X shared ownership lottery plays of Y percentage ownership increments for a selected game or games and drawing date or dates (step 100). The shared-ownership application program 32 then determines whether the open cap is greater than or equal to the number of lottery plays required to fill the request (step 101), as previously described. If not, the requested transaction is disallowed (step 103). If so, the shared ownership application program 32 then determines whether the requested number of shared-ownership lottery plays, i.e. X such plays of Y percentage increment, for the selected game(s) and drawing date(s) without the same tracking identifier are available (open) to fill the request (step 102).

Referring again to step 102, if sufficient shared-ownership lottery plays are available to fill the request, the tracking identifier is assigned to each of the lottery plays (step 107) then the shared-ownership application program 32 assigns X flagged lottery plays to the request (step 108) without performing steps 105 and 106. If sufficient shared-ownership lottery plays without the same tracking identifier are not available to fill the request, the shared-ownership application program 32 then determines whether the open cap less the open plays with the same tracking identifier is greater than or equal to the X plays requested (step 102*a*). If not, the requested transaction is disallowed (step 103). If so, the shared-ownership program 32 generates, as necessary, the additional shared-ownership lottery plays to fill the request for the selected game(s) and drawing date(s) (step 105), as previously described. As each shared-ownership lottery play is generated, it is flagged to identify it as a Y percent shared-ownership increment lottery play (step 106). The tracking identifier is then assigned to each of the lottery plays (step 107). The shared-ownership program 32 then assigns X flagged lottery plays to the request (step 108), as previously described.

After assigning the flagged lottery plays to the request, the shared-ownership program 32 updates the cumulative ownership percentage issued for each of the X assigned lottery plays (step 110), as previously described. If the cumulative ownership percentage for an assigned lottery play is less than 100% (step 112), the shared-ownership program 32 flags the assigned lottery play as "open" to indicate that it is not yet fully subscribed (step 114). If the cumulative ownership percentage for an assigned lottery play is 100% (step 112), the shared-ownership program. 32 flags the assigned lottery play as "closed" to indicate that it is fully subscribed (step 115). The shared-ownership program can then issue the assigned shared-ownership lottery play to fill the request (step 116), as previously described.

Upon reading this specification, it will be understood that each shared-ownership lottery play or pool of shared-ownership lottery plays can also consist of different sharing percentages, should the lottery decide to exercise this option. This option can be more economical for the lottery, but could pose some difficulty in the players' understanding of how the winnings are distributed. Under this option if there were ten shared-ownership lottery plays, each with a 10 percent sharing increment, and five shared-ownership lottery plays, each with a 20% sharing increment, totaling 15 lottery plays, 10 lottery plays could service the needs of both groups of plays. For example, there could be four persons who purchased ten plays totaling 40% for each of the ten lottery plays. There may also be two persons who purchased five lottery plays totaling 40% for each of the five lottery plays. The same ten lottery plays that were 40% full could accommodate the request for the five lottery plays from the two persons who are requesting a 20% ownership, eliminating the need for five additional plays. The result would be only 10 lottery plays instead of 15 and each of the ten would be made up of four 10% transactions using up 40% of the total available ownership and two 20% transactions with each applying to only 5 of the 10 plays so that each of the 10 plays would be 60% full. Therefore, each lottery play could be made up of many people with different and similar sharing increments. The advantage of this method is that fewer lottery plays need to be created. The tickets that are printed or otherwise issued would still print the appropriate sharing percent.

Figure 5:
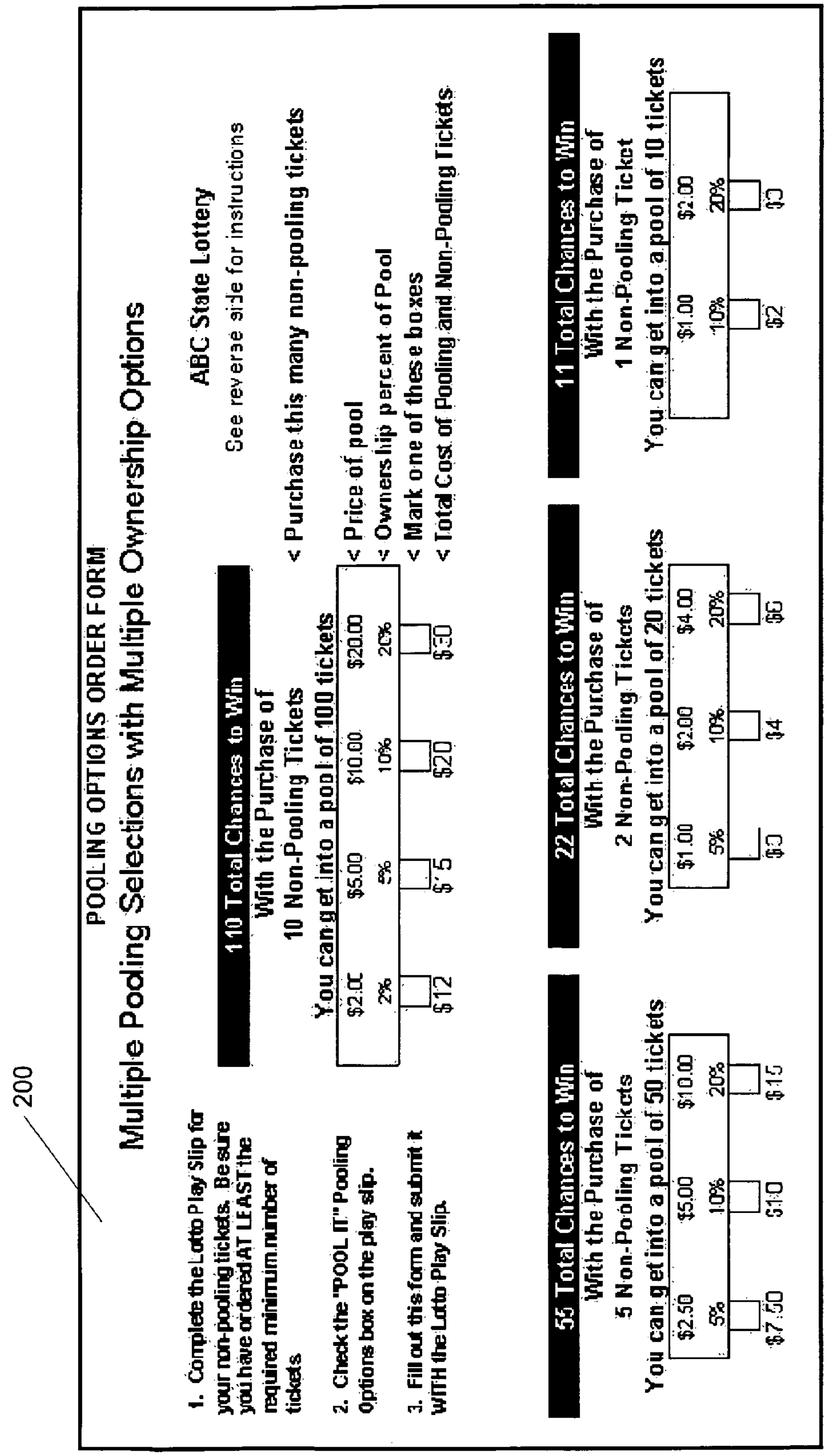
FIG. 5 shows one example of an advanced pooling options order form that can be used to request shared-ownership lottery play according to the invention.

FIG. 5 shows one example of an advanced form for pooling options order form 200 that can be used to request shared-ownership lottery plays according to the invention. Requesting shared-ownership lottery plays according to the invention may not require special play slips or may only require a small adjustment to an existing play slip. Depending on the options offered by the lottery, the request can even be a simple instruction given to the terminal operator like "Pool It," which would execute the offer by the lottery. The request can also be executed by adding one or more choices on an existing play slip where the player marks one or more boxes like they currently do for the existing game choices. If the lottery chooses, it may also create a separate play slip for the shared ownership lottery plays that can include several pool choices. The slip can be a standalone play slip or be a scanned along with another slip. FIG. 5 shows an example of a special pooling options order form that would be submitted along with the standard play slip. Thus, for example, the special pooling options order form 200 could offer the choice of a pool of 100 lottery plays (e.g., consisting of 10 pools of 10 plays each) and the player could elect to pay $2.00 to receive a 2% share, $5 to receive a 5% share, $10 to receive a 10% share or $20.00 to receive a 20% share. In this example of FIG. 5, the 100 plays are segmented into 10 pools of 10 plays each. The lottery may also choose to make the pool a single pool of 100 lottery plays, but there are economical and marketing reasons why it may want to break down large pools into smaller pooling increments, such as pool sizes of 10 plays. In the example of FIG. 5, the same play slip also offers pools of 50, 20 and 10 tickets with varying costs for varying ownership increments. Each option also states the number of 100% owned tickets (i.e., non-shared or non-pooled tickets) that must be purchased in order to participate in the shared-ownership tickets.

According to another aspect of the invention, the winnings and a special message can be printed on a special receipt, or the lottery ticket when it is submitted to the lottery or lottery retailer to collect the winnings. Currently most states retain the ticket after the winnings are paid. Some states, such as Minnesota, print the word "WINNER" on the ticket, pay the winnings and return the ticket to the winner. According to the present invention, each player will have many more winning tickets, albeit the winnings will be shared. It is recommended that the lottery return a receipt, whether it be the winning ticket or a separate receipt with a note that it was paid, but include a special message that states, for example, "Just one number away from $X,XXX,XXX" or "Just one number away from Second Prize." This lets the winner know that they were just one number away from a much larger prize, which will help keep the player interested in playing.

From the foregoing, it will be seen that there are numerous advantages to and benefits of the present invention. It can be used by state lotteries to implement a new form of lottery transaction that is based on shared-ownership lottery plays versus the current non-shared ownership lottery plays. Such a transaction can apply to any lotto game. The shared ownership transaction can be evidenced by a combination ticket showing shared and non-shared plays or by a standalone shared-ownership ticket, or it can be manifested electronically to a computer screen, telephone, etc, resulting in a unique and useful marketing product, business method and process, and business application.

The present invention provides the powerful sales incentives of: new play options, easy access to pooling, more chances to win, more winning tickets, and new prizes, resulting in more variety and excitement toward the objectives of capturing new players, recapturing lost players, and re-energizing current players to purchase more tickets. It can allow states to continue increasing the odds and therefore the jackpot without losing so many of their players because the increased odds can now be more than offset with more chances to win at an affordable price. It can provide state lotteries with a new and permanent marketing platform that: can invigorate interest and increase sales without the inconvenience and expense of a game change; does not require discounts or free offerings; and is completely parameter controlled by the individual state lottery itself. It provides the lottery with more winners, more goodwill, and positive public relations via word-of-mouth and media coverage of winner's stories. Thus, unique incentive programs can be created and controlled to better achieve desired results. It can provide a variable and controllable incentive to promote any lottery product or program. It can provide players with the security and convenience they have always wanted when pooling with others. It can provide equal access and opportunity for all adult citizens who desire to participate. It can help protect the elderly and other vulnerable citizens by removing the primary incentives used by lottery scam artists and illegal out-of-country lotteries who solicit via the phone and Internet preying on the elderly and other vulnerable adults who are looking for more chances to become a winner.

The invention in its broader aspects is not limited to the specific details, representative devices, and illustrative examples shown and described. Those skilled in the art will appreciate that numerous changes and modifications may be made to the preferred embodiments of the invention and that such changes and modifications may be made without departing from the spirit of the invention.

We claim:

1. A method for providing one or more shared-ownership lottery plays using a computer system, the method comprising:

creating by a lottery operator one or more lottery plays available for sale as one or more shared-ownership lottery plays for a selected game and drawing date;

with the computer system, storing shared-ownership lottery play information including the one or more lottery plays available for sale as one or more shared-ownership lottery plays for a selected game and drawing date;

with the computer system, receiving a request for one or more shared-ownership lottery plays for the selected game and drawing date for a player; and with the computer system, issuing for the player one or more shared-ownership lottery plays in response to the request, wherein each of the one or more issued shared-ownership lottery plays is selected from the one or more lottery plays available for shared ownership and wherein the ownership of each of the one or more issued shared-ownership lottery plays is assigned an ownership percentage increment of less than 100 percent.

2. The method of claim 1 wherein issuing the one or more shared-ownership lottery plays includes generating a receipt representing an ownership percentage in each of the one or more shared-ownership lottery plays equal to the assigned ownership percentage increment.

3. The method of claim 2 wherein generating the receipt comprises printing one or more lottery tickets representing the one or more shared-ownership lottery plays.

4. The method of claim 2 wherein generating the receipt comprises generating an electronic receipt representing the one or more shared-ownership lottery plays.

5. The method of claim 1 wherein issuing the one or more shared-ownership lottery plays is conditioned on a request for or purchase of at least one full-ownership lottery play.

6. The method of claim 1 wherein issuing the one or more shared-ownership lottery plays is conditioned on the concurrent request for or purchase of another lottery product or service that is not a full-ownership lottery play.

7. The method of claim 1 wherein the total assigned ownership percentage for any one of the one or more issued shared-ownership lottery plays can comprise either homogeneous or heterogeneous ownership percentage increments, or a combination thereof.

8. The method of claim 1 wherein the step of issuing one or more shared-ownership lottery plays comprises issuing a plurality of shared-ownership lottery plays wherein the assigned ownership percentage increment does not have to be the same for all of the issued shared-ownership plays.

9. The method of claim 1 wherein:

the request includes a request for one or more full-ownership lottery plays for a selected game and drawing date, and the method further comprises issuing one or more full-ownership lottery plays in response to the request.

10. The method of claim 9 wherein issuing the one or more shared-ownership lottery plays and issuing the one or more full-ownership lottery plays includes generating one or more receipts representing partial ownership in each of the one or more shared-ownership lottery plays and also representing full ownership in the one or more full-ownership lottery plays.

11. The method of claim 10 wherein generating the one or more receipts comprises printing one or more lottery tickets representing the one or more shared-ownership lottery plays and the one or more full-ownership lottery plays.

12. The method of claim 10 wherein generating the one or more receipts comprises generating one or more electronic receipts representing the one or more shared-ownership lottery plays and the one or more full-ownership lottery plays.

13. The method of claim 1 wherein:

the stored shared-ownership lottery play information includes an open cap on the number of shared-ownership lottery plays that can be available at a given time for the selected game and date; and the method further comprises determining whether to issue the one or more requested shared-ownership lottery plays based on the open cap, whereby the open cap limits a lottery's exposure to unfilled shared-ownership lottery plays and also limits the number of shared-ownership lottery plays a player can purchase before receiving duplicate assignments to one or more of the shared-ownership lottery plays.

14. The method of claim 13 wherein:

the request includes a tracking identifier;

the method further comprises determining whether to issue the one or more requested shared-ownership lottery plays based on the tracking identifier.

15. The method of claim 14 further comprising issuing the one or more shared-ownership lottery plays in response to the request:

if the open cap is greater than or equal to the number of requested shared-ownership lottery plays and the number of open lottery plays without a matching tracking identifier is greater than or equal to the number of requested shared-ownership lottery plays; or if the open cap is greater than or equal to the number of requested shared-ownership lottery plays, and open cap less the open plays with the matching tracking identifier is greater than or equal to the number of requested shared-ownership lottery plays.

16. A method for providing one or more shared-ownership lottery plays using a computer system, the method comprising:

creating by a lottery operator one or more lottery plays available for sale as one or more shared-ownership lottery plays for a selected game and drawing date;

with the computer system, storing shared-ownership lottery play information including the one or more lottery plays available for sale as one or more shared-ownership lottery plays for a selected game, drawing date and ownership increment;

with the computer system, receiving a request for one or more shared-ownership lottery plays for the selected game and drawing date for a player;

with the computer system, issuing for the player one or more shared-ownership lottery plays in response to the request, wherein the issued one or more shared-ownership lottery plays is selected from the one or more lottery plays available for shared ownership and wherein the ownership of each of the one or more issued shared-ownership lottery plays is assigned an ownership percentage increment of less than 100 percent;

with the computer system, receiving a subsequent contiguous request for another one or more shared-ownership lottery plays for the selected game and drawing date from a given input source for the player or for a different player; and with the computer system, issuing one or more subsequent shared-ownership lottery plays in response to the subsequent contiguous request, wherein the issued one or more shared-ownership lottery plays and the issued one or more subsequent shared-ownership plays are selected from different available shared-ownership lottery plays and wherein the ownership of each of the one or more issued subsequent shared-ownership lottery plays is assigned an ownership percentage increment of less than 100 percent.

17. The method of claim 16 wherein the issued one or more subsequent shared-ownership lottery plays are selected by sequencing through the one or more available shared-ownership lottery plays for the selected game, date and ownership increment.

18. The method of claim 16 wherein the issued one or more subsequent shared-ownership lottery plays are selected by rotating through the one or more available shared-ownership lottery plays for the selected game, date and ownership increment.

19. A method for providing one or more shared-ownership lottery plays using a computer system, the method comprising:

creating by a lottery operator one or more lottery plays available for sale as one or more shared-ownership lottery plays for a selected game and drawing date;

with the computer system, storing shared-ownership lottery play information including the one or more lottery plays available for sale as one or more shared-ownership lottery plays for a selected game, drawing date and ownership increment;

with the computer system, receiving a request for one or more shared-ownership lottery plays for the selected game and drawing date for a player;

with the computer system, assigning a tracking identifier to the request for one or more shared-ownership lottery plays;

with the computer system, issuing one or more shared-ownership lottery plays in response to the request, wherein the issued one or more shared-ownership lottery plays is selected from the one or more lottery plays available for shared ownership and wherein the ownership of each of the one or more issued shared-ownership lottery plays is assigned an ownership percentage increment of less than 100 percent;

with the computer system, receiving a second request for another one or more shared-ownership lottery plays for the selected game and drawing date;

with the computer system, assigning a tracking identifier to the second request for another one or more shared-ownership lottery plays;

with the computer system, using the stored shared-ownership lottery play information and the tracking identifiers to issue a subsequent one or more shared-ownership lottery plays in response to the second request, wherein the issued one or more shared-ownership lottery plays and the issued subsequent one or more shared-ownership plays are selected from different available shared-ownership lottery plays and wherein the ownership of each of the one or more issued subsequent shared-ownership lottery plays is assigned an ownership percentage increment of less than 100 percent.

20. The method of claim 19 wherein the tracking identifier is provided via a player identification card.

21. The method of claim 19 wherein the tracking identifier is provided via a pooling card.

22. The method of claim 19 wherein the tracking identifier is provided via a lottery ticket.

23. A method for providing one or more pools of shared-ownership lottery plays using a computer system, the method comprising:

creating by a lottery operator a plurality of lottery plays available for sale as shared-ownership lottery plays for a selected game and drawing date;

with the computer system, storing pool information including information associating a plurality of the lottery plays available for sale with one or more pools of shared-ownership lottery plays for the selected game and drawing date;

with the computer system, receiving a request for one or more of the pools of shared-ownership lottery plays for a player; and with the computer system, issuing for the player one or more of the shared-ownership lottery plays for the player in response to the request, wherein each of the issued shared-ownership lottery plays is included in one or more pools of plays available for shared ownership and wherein the ownership of each of the issued shared-ownership lottery plays, or the ownership of the one or more pools of shared-ownership lottery plays, is assigned an ownership percentage increment of less than 100 percent.

24. The method of claim 23 wherein issuing the plurality of shared-ownership lottery plays includes generating a receipt representing a partial ownership in each of the one or more shared-ownership lottery plays, or a partial ownership in the one or more pools of shared-ownership lottery plays, equal to the assigned ownership percentage increment.

25. The method of claim 24 wherein generating the receipt comprises printing one or more lottery tickets representing the plurality of shared-ownership lottery plays, or the one or more pools of shared-ownership lottery plays.

26. The method of claim 24 wherein generating the receipt comprises generating an electronic receipt representing the plurality of shared-ownership lottery plays, or the one or more pools of shared-ownership lottery plays.

27. The method of claim 23 wherein issuing the plurality of shared-ownership lottery plays, or the one or more pools of shared-ownership lottery plays, is conditioned on the purchase of at least one full-ownership lottery play.

28. The method of claim 23 wherein issuing the plurality of shared-ownership lottery plays, or the one or more pools of shared-ownership lottery plays, is conditioned on the concurrent request for or purchase of another lottery product or service that is not a full-ownership lottery play.

29. The method of claim 23 wherein the total assigned ownership percentage for each of the plurality of issued shared-ownership lottery plays, or the one or more pools of shared-ownership lottery plays, comprises either homogeneous or heterogeneous ownership percentage increments, or a combination thereof.

30. The method of claim 23 wherein the step of issuing the shared-ownership lottery plays comprises a plurality of pools of shared-ownership lottery plays and wherein the assigned ownership percentage increment does not have to be the same for all of the pools of shared-ownership plays.

31. The method of claim 23 wherein:

the request further includes a request for one or more full-ownership lottery plays for a selected game and drawing date, and the method further comprises issuing one or more full-ownership lottery plays in response to the request.

32. The method of claim 31 wherein issuing one or more shared-ownership lottery plays and issuing one or more full-ownership lottery plays includes generating one or more receipts representing a partial ownership in each of the one or more shared-ownership lottery plays, or a partial ownership in the one or more pools of shared-ownership lottery plays, and also representing full ownership in the one or more full-ownership lottery plays.

33. The method of claim 32 wherein generating the one or more receipts comprises printing one or more lottery tickets representing the one or more shared-ownership lottery plays, or the one or more pools of shared-ownership lottery plays, and the one or more full-ownership lottery plays.

34. The method of claim 32 wherein generating the one or more receipts comprises generating one or more electronic receipts representing the one or more shared-ownership lottery plays, or the one or more pools of shared-ownership lottery plays, and the one or more full-ownership lottery plays.

35. The method of claim 23 further comprising:

storing an open cap on the number of pools of shared-ownership lottery plays that can be available at a given time for the selected game and date; and determining whether to issue the one or more shared-ownership lottery plays in response to the request based on the open cap, whereby the open cap limits a lottery's exposure to unfilled pools of shared-ownership lottery plays and also limits the number of pools of shared-ownership lottery plays that a player can purchase before receiving duplicate assignments to one or more of the pools of shared-ownership lottery plays.

36. The method of claim 35 wherein:

the request includes a tracking identifier;

the method further comprises determining whether to issue the one or more shared-ownership lottery plays in response to the request based on the tracking identifier.

37. The method of claim 35 further comprising issuing the one or more shared-ownership lottery plays in response to the request:

if the open cap is greater than or equal to the number of requested pools of shared-ownership lottery plays and the number of open pools of shared-ownership lottery plays without a matching tracking identifier is greater than or equal to the number of requested pools of shared-ownership lottery plays; or if the open cap is greater than or equal to the number of requested pools of shared-ownership lottery plays, and the open cap less the number of open pools of shared-ownership lottery plays with a matching tracking identifier is greater than or equal to the number of requested pools of shared-ownership lottery plays.

38. A method for providing one or more shared-ownership lottery plays using a computer system, the method comprising:

creating by a lottery operator a plurality of lottery plays available for sale as shared-ownership lottery plays for a selected game and drawing date;

with the computer system,-storing pool information including information associating a plurality of the lottery plays available for sale as a plurality of pools of shared-ownership lottery plays for a selected game and drawing date;

with the computer system, receiving a request for a pool of shared-ownership lottery plays for the selected game and drawing date for a player;

with the computer system, issuing for the player a set of shared-ownership lottery plays in response to the request, wherein each of the issued shared-ownership lottery plays is associated with one of the available pools of lottery plays and wherein the ownership of each of the lottery plays in the issued set of shared-ownership lottery plays, or the ownership of their one or more associated pools of lottery plays, is assigned an ownership percentage increment of less than 100 percent;

with the computer system, receiving a subsequent contiguous request for another pool of shared-ownership lottery plays for the selected game and drawing date for the player or for a different player;

with the computer system, issuing a subsequent set of shared-ownership lottery plays in response to the subsequent contiguous request, wherein the issued set of shared-ownership lottery plays and the issued subsequent set of shared-ownership lottery plays are each associated with different pools of the plurality of pools of shared-ownership lottery plays and wherein the ownership of each of lottery plays in the issued subsequent set of shared-ownership lottery plays, or the ownership of their one or more associated pools of lottery plays, is assigned an ownership percentage increment of less than 100 percent.

39. The method of claim 38 wherein the issued subsequent set of shared-ownership lottery plays is selected by sequencing through the plurality of pools of shared-ownership lottery plays for the selected game and date.

40. The method of claim 38 wherein the issued subsequent set of shared-ownership lottery plays is selected by rotating through the plurality of pools of shared-ownership lottery plays for the selected game and date.

41. A method for providing one or more pools of shared-ownership lottery plays using a computer system, the method comprising:

creating by a lottery operator a plurality of lottery plays available for sale as shared-ownership lottery plays for a selected game and drawing date;

with the computer system, storing pool information for grouping the plurality of shared-ownership lottery plays into a plurality of pools of shared-ownership lottery plays;

with the computer system, receiving a request for a pool of shared-ownership lottery plays for the selected game and drawing date for a player;

using the computer system to assign a tracking identifier to the request for a pool of shared-ownership lottery plays;

with the computer system, issuing for the player a set of shared-ownership lottery plays in response to the request, wherein each of the shared-ownership lottery plays in the issued set is associated with one of the available pools of lottery plays and wherein the ownership of each of the issued lottery plays, or the ownership of the pool of lottery plays, is assigned an ownership percentage increment of less than 100 percent;

with the computer system, receiving a second request for another pool of shared-ownership lottery plays for the selected game and drawing date;

with the computer system, assigning a tracking identifier to the second request for another pool of shared-ownership lottery plays;

with the computer system, using the stored shared-ownership lottery pool information and the tracking identifiers to issue a subsequent set of shared-ownership lottery plays in response to the second request, wherein the issued set of shared-ownership lottery plays and the issued subsequent set of shared-ownership lottery plays are each associated with different pools of the plurality of pools of shared-ownership lottery plays and wherein the ownership of each of the issued subsequent lottery plays, or the ownership of their associated pool of lottery plays, is assigned an ownership percentage increment of less than 100 percent.

42. The method of claim 41 wherein the tracking identifier is provided via a player identification card.

43. The method of claim 41 wherein the tracking identifier is provided via a pooling card.

44. The method of claim 41 wherein the tracking identifier is provided via a lottery ticket.

45. A method for providing one or more shared-ownership lottery plays for a lottery drawing using a computer system, the method comprising:

creating by a lottery operator one or more lottery plays available for sale as one or more shared-ownership lottery plays for a selected game and drawing date;

with the computer system, storing shared-ownership lottery play information including the one or more lottery plays available for sale as one or more shared-ownership lottery plays for a selected game and drawing date;

with the computer system, receiving a request for one or more shared-ownership lottery plays for the selected game and drawing date for a player;

with the computer system, issuing for the player one or more shared-ownership lottery plays in response to the request, wherein each of the one or more issued shared-ownership lottery plays is selected from the one or more lottery plays available for shared ownership and wherein each of the one or more issued shared-ownership lottery plays is assigned an ownership percentage increment of less than 100 percent; and returning a receipt to a player with information regarding a result of the lottery drawing for the selected game and drawing date and the proximity of the issued one or more shared-ownership lottery plays to a lottery play awarded a higher prize than the issued one or more lottery plays.

* * * * *